B. A. SLOCUM.
PHOTOGRAPHIC SHUTTER.
APPLICATION FILED JULY 15, 1919.
1,333,041.
Patented Mar. 9, 1920.
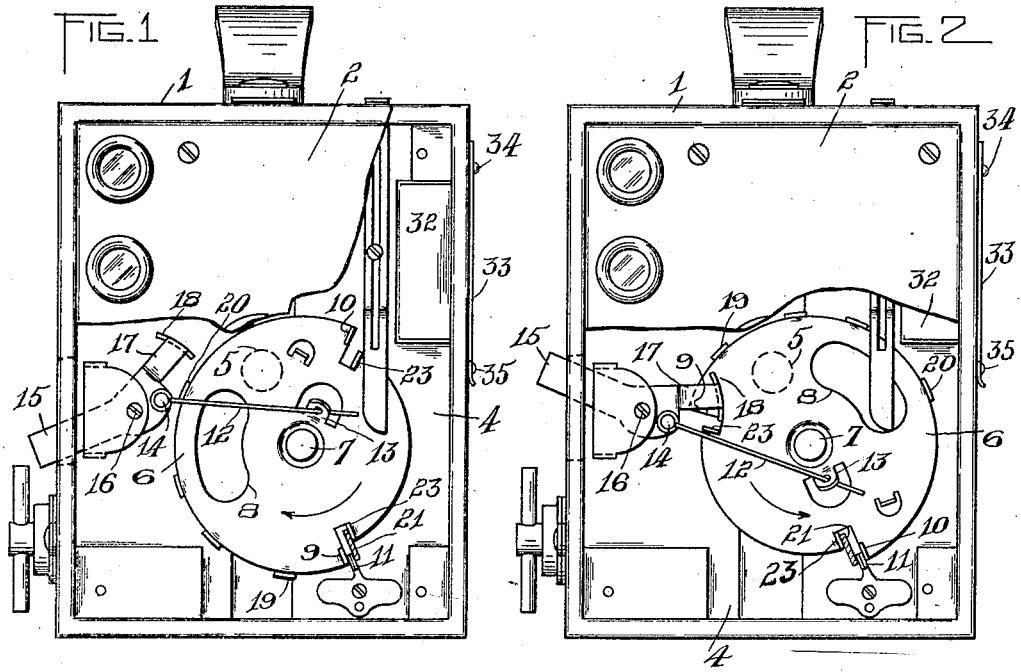
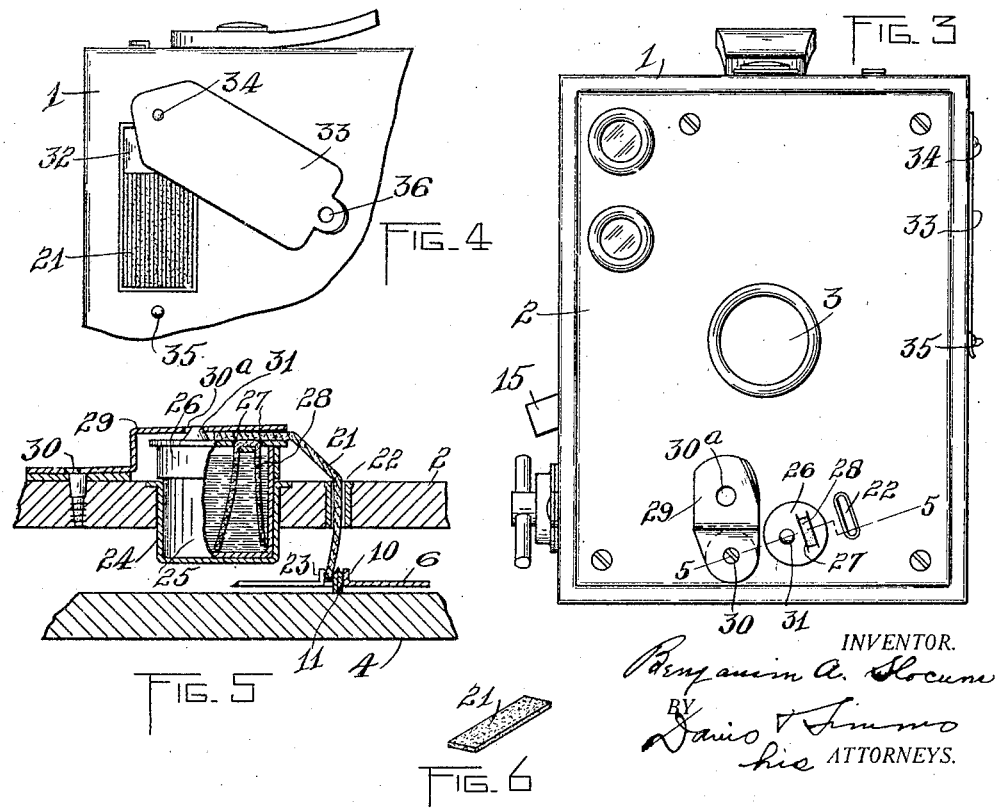
INVENTOR.
Benjamin A. Slocum
BY
his ATTORNEYS.

UNITED STATES PATENT OFFICE.

BENJAMIN A. SLOCUM, OF ROCHESTER, NEW YORK.

PHOTOGRAPHIC SHUTTER.

1,333,041.   Specification of Letters Patent.   Patented Mar. 9, 1920.

Application filed July 15, 1919. Serial No. 310,942.

*To all whom it may concern:*

Be it known that I, BENJAMIN A. SLOCUM, a citizen of the United States, and resident of Rochester, in the county of Monroe and State of New York, have invented certain new and useful Improvements in Photographic Shutters, of which the following is a specification.

The present invention relates to photographic shutters and an object thereof is to provide a means for delaying the opening of a shutter after energy has been stored in the motor or spring by a manually operable member and the manually operable member has been released. Another object of the invention is to provide a yielding stop which will delay the opening of the shutter after the latter has been set for opening so that the person operating or setting the shutter may have time to be included in the picture to be taken.

To these and other ends, the invention consists of certain parts and combinations of parts, all of which will be hereinafter described, the novel features being pointed out in the appended claims.

In the drawings:

Figure 1 is a front view of a box camera in which the front wall has been removed in order to disclose the shutter, the parts of the shutter being in the positions which they occupy when the shutter is set for operation in one direction;

Fig. 2 is a similar view showing the shutter set for operation in the opposite direction;

Fig. 3 is a front view of the camera showing the stop holding device shifted to expose the moistening means;

Fig. 4 is a detail view showing a portion of the camera provided with a pocket in which the stop holding devices are stored;

Fig. 5 is an enlarged sectional view on the line 5—5, Fig. 3, showing in detail the moistening means and the position of the stop in connection with the shutter; and Fig. 6 is a detail perspective view of one of the stops.

Referring more particularly to the drawings, 1 indicates the camera body having a removable front wall 2 provided with an aperture 3. In rear of this front wall a partition 4 is arranged having an aperture 5, the space between the front wall and the partition forming a chamber or compartment in which the shutter blade 6 operates. The shutter blade 6, in this instance is mounted to swing about an axis 7 in order to bring an exposure opening 8 in the blade between the apertures 3 and 5, the shutter moving alternately in opposite directions so that the stops or shoulders 9 and 10 thereon are brought against a stationary stop 11 in order to limit the movement of the shutter. Combined with the shutter blade is a motor preferably in the form of a spring 12 in which energy is stored for the purpose of effecting the opening and the closing of the shutter blade from either one of its two positions against the stop 11. This spring, in this instance, is in the form of an arm having a sliding engagement with an eccentrically arranged lug 13 struck up from the metal of the shutter blade 6. This spring arm is, in this instance, secured at 14 to a manually operable member or lever 15 which is pivoted at 16 between the front wall 2 and the partition 4 and extends through a slot in the camera casing to the exterior of such camera casing, whereby the lever may be shifted in order to tension the spring and communicate the energy therein to the shutter blade. The lever turns with friction as is usual so that it will stay in any position to which it may be shifted. For the purpose of obtaining quick action of the shutter blade, the lever 15 is provided with an arm or extension 17 having a laterally turned portion 18 forming a curved stop adapted to coöperate either with the lateral projection 19 or the lateral projection 20 for the purpose of holding the shutter against movement until such time that energy has been stored in the spring 12, this stop 18 then releasing the shutter blade to permit such blade to move under the action of the spring.

The foregoing parts of the shutter are old and well-known and no claim *per se* is made thereto, nor is this invention to be limited to the construction hereinbefore set forth. The feature of this invention is the means by which the opening of the shutter blade is delayed after energy has been stored in the spring or motor and the manually operable actuating lever or the member has been released. This means in this instance is in the form of a yielding stop 21 preferably a strip of blotting paper which is introduced through a slot or opening 22 formed in the front wall of the camera casing and adapted to coöperate with the stop 11 and also with either one of two shoulders 23 formed on the shutter blade adjacent the stops or shoulders 9 and 10. By forming the stop 21 of blotting paper, it has sufficient strength to hold the shutter blade against movement after the energy has been stored in the spring and the actuating lever 15 has been released. If however, water is fed to the outer end of this blotting paper capillary attraction will conduct this water throughout the length of the blotting paper so that eventually the blotting paper becomes so soft that it yields to the action of the spring and permits the shutter blade to move to open the shutter and then to close the same.

Any suitable means may be employed for feeding water to the blotting paper. In this instance, the front wall 2 is provided with a metallic socket 24 in which the water receptacle 25 is fitted, this water receptacle having a removable closure 26 provided with two slits 27 through which is laced a wick 28, which has its ends lying in the water receptacle. If the outer end of the blotting paper be brought into contact with this wick, the blotting paper will absorb the moisture from the wick and conduct such moisture slowly throughout the length of the paper. If desired, a retaining device 29 in the form of an angle plate pivoted at 30 may be swung over the top of the water receptacle for the purpose of clamping the blotting paper against the wick. To hold the plate in this position, the latter is provided with an opening 30ª adapted to engage over a projection 31 on the top of the cover of the receptacle. If desired, the camera body 1 may be provided in one side with a chamber 32 in which a number of blotting strips 21 may be stored, this chamber having a closure 33 hinged at 34 and secured in closed position by the projection 35 engaging in an opening 36 at the swinging end of the closure.

For taking a picture which will include himself, the user of the camera places the latter on a stationary support. One of the strips 21 is removed from the chamber 32 and introduced through the slot 22 so that its inner end will lie between the stationary abutment 11 and one of the abutments 23 on the shutter. The outer end of the strip is then bent over the top of the container 25 so as to lie against the wick 28 after which the retainer 29 is swung over and engages the strip 21 to hold the latter in the position shown in Fig. 5. Immediately thereafter, the actuating lever 15 is shifted to store energy in the spring 12. The strip 21 will hold the shutter blade against movement until the moisture communicated to the strip 21 by the wick 28 has entirely saturated the strip 21. When this occurs, the strip 21 will yield and permit the shutter to open and then to close the exposure opening of the camera. The time required for the strip 21 to become saturated is sufficient to permit the user to assume a position in front of the camera after releasing the actuating lever.

From the foregoing it will be seen that there has been provided a simple and inexpensive construction which will permit the user of a camera to include himself in a picture taken by such camera. This result is accomplished by providing means which, after energy has been stored in the spring or motor and the manually operable member which effects the actuation of the shutter is released and, will delay the opening of the shutter blade for sufficient time to permit the user to be positioned to be included in the picture. This delaying means, in this instance, is in the form of a yielding stop preferably comprising a strip of absorbent material, which, before it is moistened, has sufficient rigidity to hold the shutter blade under the spring action, but which, when moistened, yields and permits the movement of the shutter blade. The moistening is preferably effected by a receptacle which is mounted upon the camera in an inconspicuous position.

What I claim as my invention and desire to secure by Letters Patent is:

1. The combination with a shutter blade, a spring for shifting the blade to effect the opening and the closing of the camera aperture, and a manually operable member for storing energy in the spring, of means for delaying the opening of the aperture by the shutter blade after energy has been stored in the spring and the manually operable member has been released.

2. The combination with a shutter blade, an actuating lever, and a spring in which energy is stored by the actuating lever to shift the shutter blade, of means for delaying the opening of the shutter blade after energy has been stored in the spring and the actuating lever has been released.

3. The combination with a shutter blade, a spring for shifting the blade to effect the opening and the closing of the camera aperture, and a manually operable member for storing energy in the spring, of a yielding stop for delaying the opening of the shutter after energy has been stored in the spring and the manually operable member has been released.

4. The combination with a shutter blade, a spring for shifting the blade to effect the opening and the closing of the camera aperture, and a manually operable member for storing energy in the spring, of a stop for holding the shutter blade against opening after energy has been stored in the spring and the manually operable member has been released, and means acting on said stop to cause it to release the shutter blade.

5. The combination with a shutter blade, a spring for shifting the blade to effect the opening and the closing of the camera aperture, and a manually operable member for storing energy in the spring, of a stop of absorbent material for holding the shutter blade against opening after energy has been stored in the spring, and the manually operable member has been released.

6. The combination with a shutter blade, a spring for shifting the blade to effect the opening and the closing of the camera aperture, and a manually operable member for storing energy in the spring, of a stop of absorbent material for holding the shutter blade against opening after energy has been stored in the spring and the manually operable member has been released, and means arranged on the camera for supplying moisture to the absorbent material.

7. The combination with a shutter blade, a spring for shifting said blade alternately in opposite directions to effect the opening and the closing of the camera aperture, and a manually operable member for storing energy in the spring, of means for delaying the opening of the shutter in both directions of its movement after the manually operable member has been released and energy has been stored in the spring.

8. The combination with a shutter blade mounted to turn about an axis alternately in opposite directions, an actuating lever movable alternately in opposite directions, and a spring connected with said actuating lever and coöperating with an eccentric point on said shutter blade, of means for delaying the opening of the shutter blade in both directions of its movement after the manually operable member has been released and the energy has been stored in the spring.

9. The combination with a shutter blade mounted to turn in opposite directions about a suitable axis, a spring for shifting said blade alternately in opposite directions to effect the opening and the closing of the camera aperture, and a manually operable member for storing energy in the spring, of a stop coöperating with said shutter blade to hold it against opening at either of its closed positions after energy has been stored in the spring and the manually operable member has been released, and means acting on said stop to cause it to release the shutter blade.

10. In combination with a shutter blade, a stop formed of absorbent material and adapted to engage with said shutter blade to hold the latter against movement.

11. The combination with a shutter blade, of a wall arranged in front of said shutter blade and having an opening therein, and a yielding stop inserted in said opening and coöperating with the shutter blade to hold the latter against movement.

12. The combination with a shutter blade, of a wall arranged in front of said shutter blade and having an opening, a stop formed of absorbent material and arranged in said opening to engage the shutter blade in order to hold the latter against movement, and a container mounted on said wall to feed moisture to said stop.

13. The combination with a shutter blade, of a wall arranged in front of said blade and having an opening therein, a stop formed of absorbent material and arranged in said opening to engage the shutter blade in order to hold the latter against movement, a container for water or the like supported on said wall and having a feed wick with which the absorbent stop may engage, and a retainer for holding said absorbent stop against said feed wick.

14. The combination with a shutter blade, of a wall arranged in front of said blade and provided with a pocket and an opening, an absorbent stop inserted through said opening to engage the blade in order to hold the latter against movement, a water container fitted in said pocket provided with a wick with which the absorbent stop may engage, and a retainer for holding the absorbent stop against the wick and the container in the pocket.

BENJAMIN A. SLOCUM.